United States Patent
Bente

[19]

[11] Patent Number: 6,161,594
[45] Date of Patent: Dec. 19, 2000

[54] PIPE BEND

[75] Inventor: Cornelis Wilhelmus Maria Bente, Arnhem, Netherlands

[73] Assignee: Wisa B.V., Arnhem, Netherlands

[21] Appl. No.: 09/367,998

[22] PCT Filed: Feb. 25, 1998

[86] PCT No.: PCT/NL98/00112

§ 371 Date: Nov. 22, 1999

§ 102(e) Date: Nov. 22, 1999

[87] PCT Pub. No.: WO98/37283

PCT Pub. Date: Aug. 27, 1998

[30] Foreign Application Priority Data

Feb. 25, 1997 [NL] Netherlands ............................ 1005365

[51] Int. Cl.[7] .................................................. F15D 55/00
[52] U.S. Cl. ................................ 138/177; 138/37; 138/39
[58] Field of Search ................................ 138/177, 37, 39, 138/40

[56] References Cited

U.S. PATENT DOCUMENTS

| | | | |
|---|---|---|---|
| 2,468,360 | 4/1949 | Dressel | 138/37 X |
| 2,721,660 | 10/1955 | Woodrow | 138/37 X |
| 4,162,546 | 7/1979 | Shortell | 138/37 X |
| 4,232,710 | 11/1980 | Gallo et al. | 138/37 |
| 4,315,715 | 2/1982 | Nishiguchi et al. | 138/37 X |
| 4,824,614 | 4/1989 | Jones | 138/37 X |
| 5,213,138 | 5/1993 | Presz, Jr. | 138/37 X |
| 5,230,369 | 7/1993 | Presz, Jr. | 138/37 X |
| 5,687,768 | 11/1997 | Mull, Jr. et al. | 138/37 X |

FOREIGN PATENT DOCUMENTS

| | | |
|---|---|---|
| 0011778 | 6/1980 | European Pat. Off. . |
| 0493302 | 7/1992 | European Pat. Off. . |
| 3501693 | 7/1986 | Germany . |
| 98 02 877 | 5/1989 | Germany . |
| 2041477 | 9/1980 | United Kingdom . |

*Primary Examiner*—Patrick Brinson
*Attorney, Agent, or Firm*—Webb Ziesenheim Logsdon Orkin & Hanson, P.C.

[57] ABSTRACT

A pipe bend for a siphon installation formed by two straight pipe parts and a curved pipe part connecting these parts, which pipe bend is provided with a guide extending from the curved connecting part in one of the pipe parts for guiding a liquid flow in that pipe part. The flow guide can include a rib protruding from a side wall of the pipe part and extending at an angle to the center line thereof. A siphon installation provided with such a pipe bend, in addition to a liquid discharge system in which such a siphon installation is arranged, is also disclosed.

9 Claims, 4 Drawing Sheets

PIPE BEND

BACKGROUND OF THE INVENTION

1. Field of the Invention

The invention relates to a pipe bend, in particular for a siphon installation, formed by two pipe parts, the centre lines of which enclose an angle, and a curved pipe part connecting these parts, including means extending from the curved connecting part in one of the pipe parts for guiding a liquid flow in the pipe part. Such a pipe bend is known from e.g. EP-A-0 493 302 or GB-A-2 041 477.

2. Description of the Prior Art

The first mentioned prior art document EP-A-0 493 302 discloses a mechanism to reduce pressure losses in angled conduits for transporting liquids. These pressure losses result from two-dimensional boundary layer separation wich occurs immediately downstream of sharp turns in the conduit. In order to eliminate or decrease such separation the prior art document provides a convoluted surface on the inner corner surface of the pipe bend, which surface is defined by a number of ridges protruding form the inner corner surface into the pipe bend and extending parallel to the direction of flow of the liquid. These ridges and the throughs defined therebetween produce a flow variation which allows the boundary layer to re-attach to the inner surface quickly.

GB-A-2 041 477 discloses a fluid pipeline elbow having provisions for suppressing cavitation. These provision include a curved vane provided in this elbow and spanning the width of the pipeline from one sidewall to the other. This curved vane extends substantially parallel to the centreline of the pipeline elbow, but may have its upstream edge arranged at a slight angle to the centreline of the upstream portion of the pipe.

Both prior art documents discussed above are intended to guide a flow of liquid through a pipe bend with minimal disturbance, i.e. such that the flow closely follows the course of the pipe bend. Such pipe bends are not suitable for connecting a riser pipe and a fall pipe in a siphon installation as the smooth flow of liquid will not start siphoning action.

The design of a pipe bend for use in a siphon installation to connect a riser pipe and a fall pipe is of great importance for the response of a siphon installation. In fact the siphoning action begins when a liquid in the riser pipe has risen so far that it flows through the pipe bend to the fall pipe and there forms a liquid curtain which covers the whole cross-section of the fall pipe. An underpressure is in that case generated behind the liquid curtain, whereby liquid is drawn up out of the riser pipe, whereafter a new liquid curtain is formed which again generates an underpressure, and so on. In this manner liquid is siphoned out of the riser pipe to the fall pipe. A siphon installation operating according to this principle is described for instance in the European patent specification 0 011 778 and is applied particularly in systems for draining waste water from dwellings. The siphon installation is herein intended to guarantee a considerable flow speed in the pipe system, even in the case of relatively small quantities of waste water, whereby a good flushing action is obtained and the risk of deposition and blockage is reduced.

The importance of a good design of the siphon installation, and particularly of the pipe bend used therein, is increasing now that the water consumption per household is being pushed back ever further and the quantity of water available in the system for flushing is therefore becoming smaller. The invention therefore has for its object to provide an improved pipe bend which is distinguished from known pipebends in that said flow guiding means are arranged for forming, in use, a liquid curtain for starting a siphoning action. By thus guiding the liquid flow such that a liquid curtain is formed, the pipe part is closed off relatively quickly and an underpressure is created behind the liquid curtain, which is important for starting a siphoning action.

SUMMARY OF THE INVENTION

The flow guiding means according to the present invention preferably comprise at least one rib protruding from a wall of the pipe part that constitutes a side wall when in use and extending at an angle to the centre line thereof. Advantageously the rib even extends transversely of the centre line. The liquid is hereby quickly distributed over the entire cross-section of the pipe part while forming a liquid curtain. Advantageously the rib herein encloses an angle with the centre line of the other pipe part which is larger than the angle enclosed by the two pipe parts. At least the first part of the rib can thus be directed practically parallel to the neutral flow of the liquid through the pipe bend.

In a preferred embodiment of the pipe bend according to the invention, an element disturbing the liquid flow is arranged in the curved connecting part and the rib is placed in the line of the flow-disturbing element and connected thereto. Such a flow-disturbing element, an example of which is described in applicant's non-prepublished Netherlands patent application 1003672, already results per se in an improvement in the response of the siphon installation. By combining this element with a flow-guiding rib according to the present invention a pipe bend is obtained in which a liquid curtain can already be formed with a very small quantity of liquid.

The invention further relates to a siphon installation provided with at least one riser pipe inclining in upward direction as seen in the siphoning direction, in use, and a downward directed fall pipe connected thereto at the upper end of the pipes by a pipe bend as described above and wherein flow guiding means extend in the pipe part connected to the fall pipe. Such a siphon installation has, for the reasons explained above, a very good response.

The invention will now be elucidated on the basis of an embodiment, wherein reference is made to the annexed drawing, in which.

Figure 1:
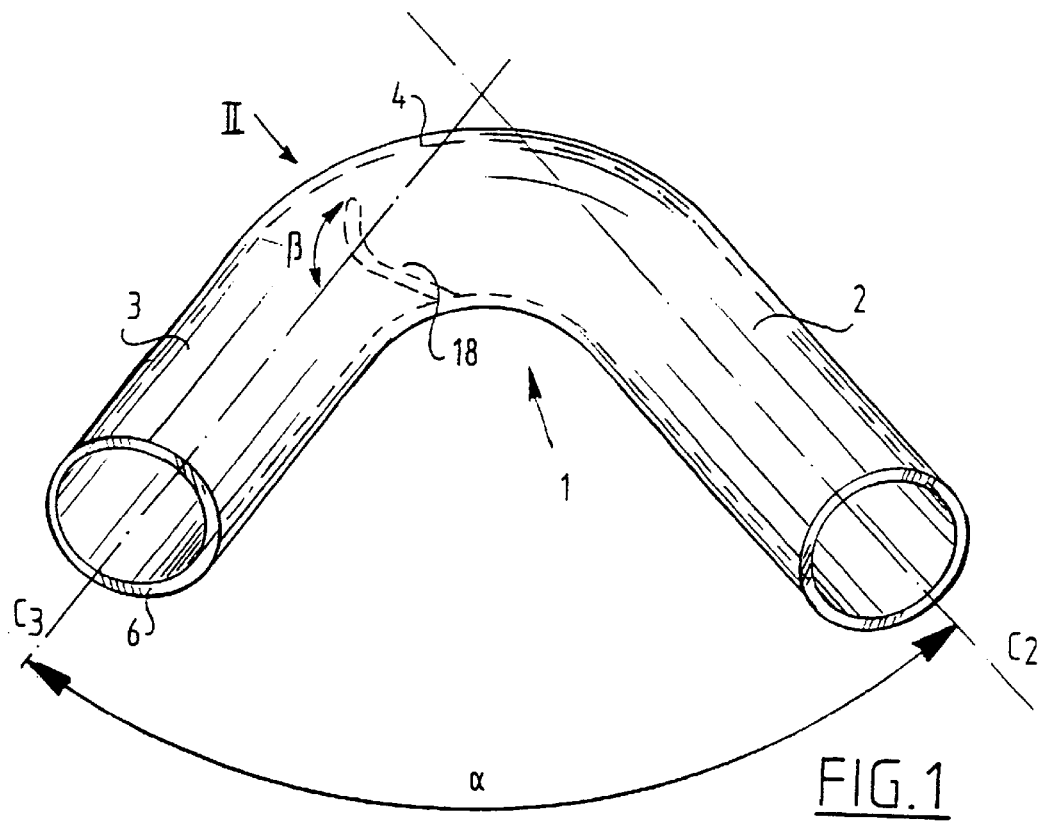
FIG. 1 shows a schematic perspective view of a pipe bend according to the invention.
Figure 3:
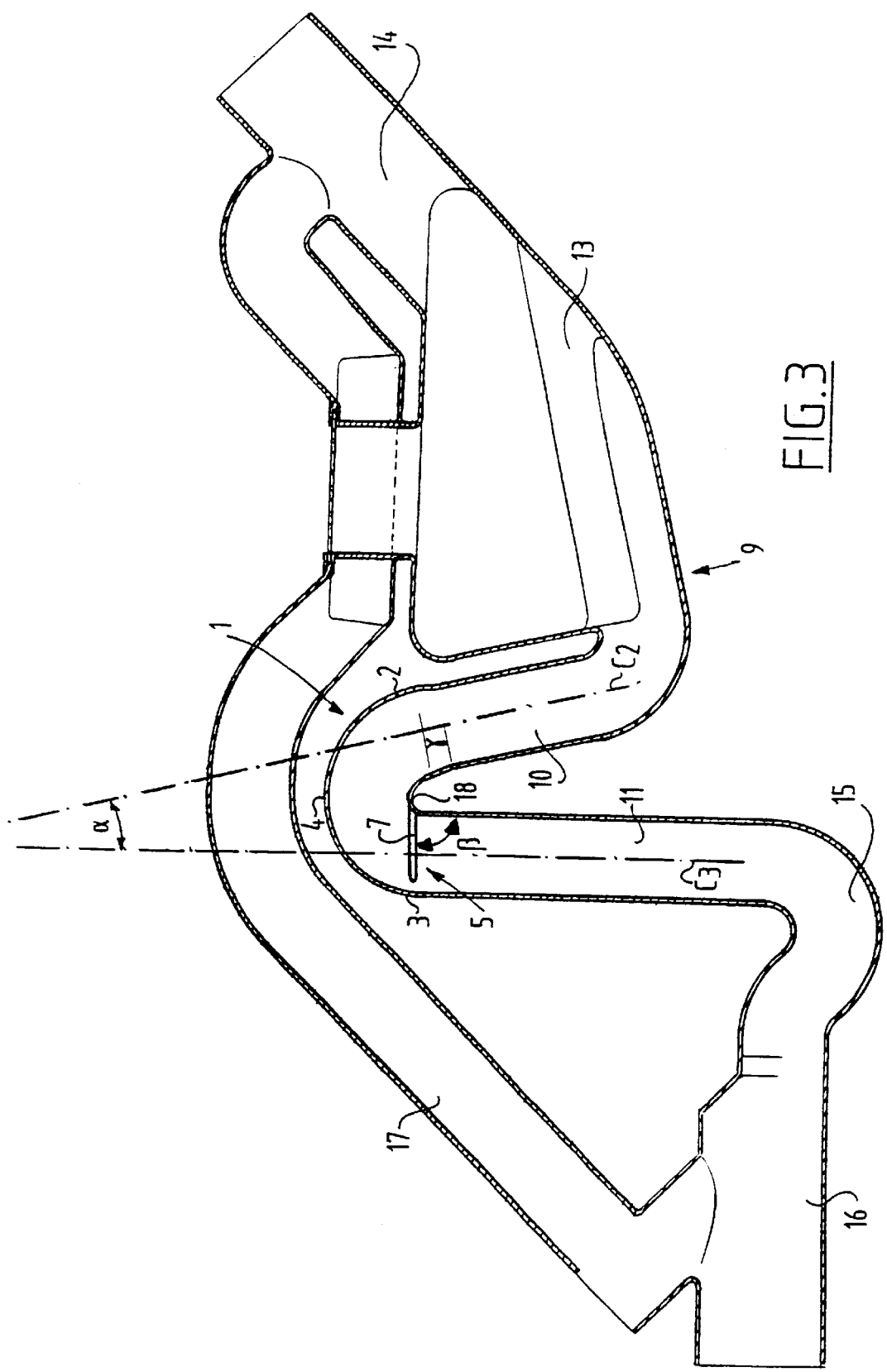
FIG. 3 is a longitudinal section through a siphon installation with a pipe bend according to the invention.

A pipe bend 1 (FIG. 1) is formed by two, in this case substantially straight pipe parts 2,3, the centre lines $C_2$, $C_3$ of which enclose an angle $\alpha$, and a curved pipe part 4 connecting these parts 2,3. Pipe bend 1, which is particularly intended for use in a siphon installation, has means 5 for guiding a liquid flow F. These flow guiding means 5 extend from the curved connecting part 4 into pipe part 3 and take the form of a rib 7 protruding from a side wall 6 of pipe part 3 and enclosing an angle $\beta$ with the centre line $C_3$ thereof. In the shown embodiment the angle $\beta$ is practically a right angle. Rib 7 herein encloses an angle $\gamma$ with the centre line $C_2$ of the other pipe part 2 (FIG. 3) which is larger than the angle α which is enclosed by the two pipe parts 2,3, so that rib 7 extends roughly according to a tangent to the bottom 18 of the curved connecting part 4.

Figure 2:
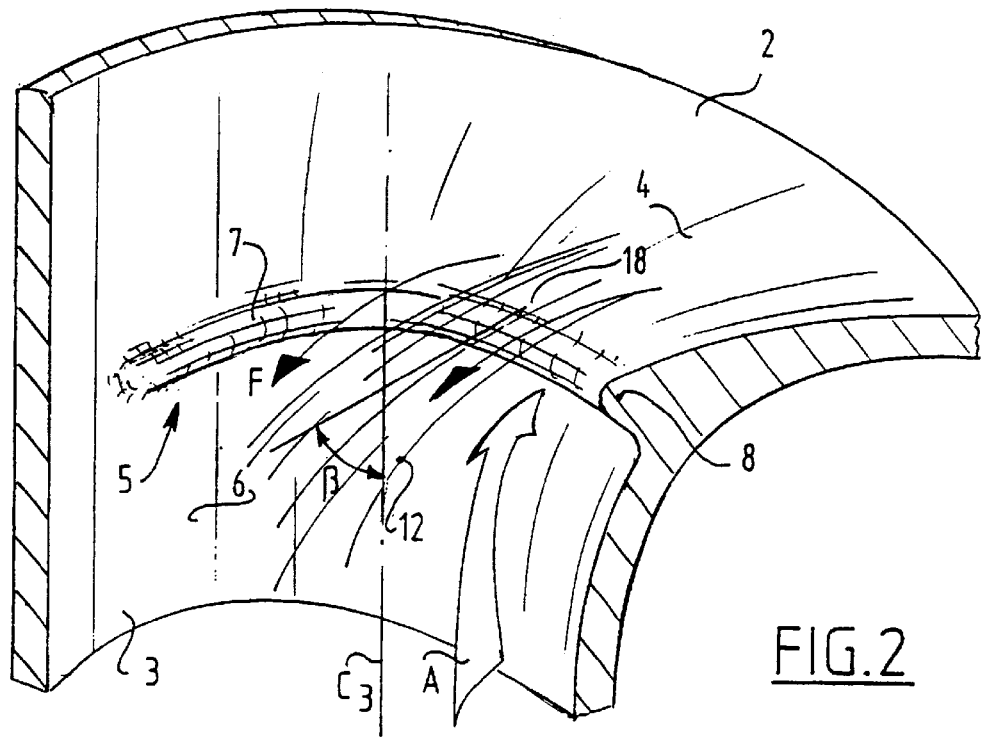
FIG. 2 shows a detailed view along arrow II in FIG. 1.

The flow F of a liquid is hereby guided over rib 7 along the side wall 6 of pipe part 3 (FIG. 2), wherein the liquid flowing along wall 6 will, as a result of the cohesion, carry along a liquid curtain 12 which closes off the cross-section of pipe part 3. As the liquid flows along wall 6 the flow moreover moves clear of the bottom 18 of curved connecting part 4, so that air can penetrate thereunder as according to arrow A, whereby the process of seperation of the liquid flow from the bottom 18 of curved pipe part 4 is reinforced. The result of this flow is therefore that in the case of a comparatively small supply of liquid in curved pipe part 4 a liquid curtain 12 will already be formed which "crosses" pipe part 3 and seals it whereby, when liquid curtain 12 falls downward through pipe part 3, an underpressure will be created therebehind in curved connecting part 4 and pipe part 2, which will result in more liquid being drawn in from pipe part 2 and through connecting part 4, whereby a siphoning action is started. Owing to the specific embodiment of pipe bend 1, this siphoning action is started with a considerably smaller quantity of liquid than when a pipe bend with smooth inner walls is used.

Ribs 7 can in principle be arranged on either side of the passage opening of pipe part 3, but it has been found in practice that a single rib 7 suffices very well. The effect of the flow guiding rib 7 can be further enhanced by arranging in curved connecting part 4 an element 8 disturbing the flow in the manner as described in applicant's earlier, non-prepublished Netherlands patent application 1003672. Rib 7 can herein be placed in line with flow-disturbing element 8 and connected thereto, so that a continuous sharp edge is formed, whereby liquid flow F is carried clear of the bottom 18 of connecting part 4.

Figure 4:
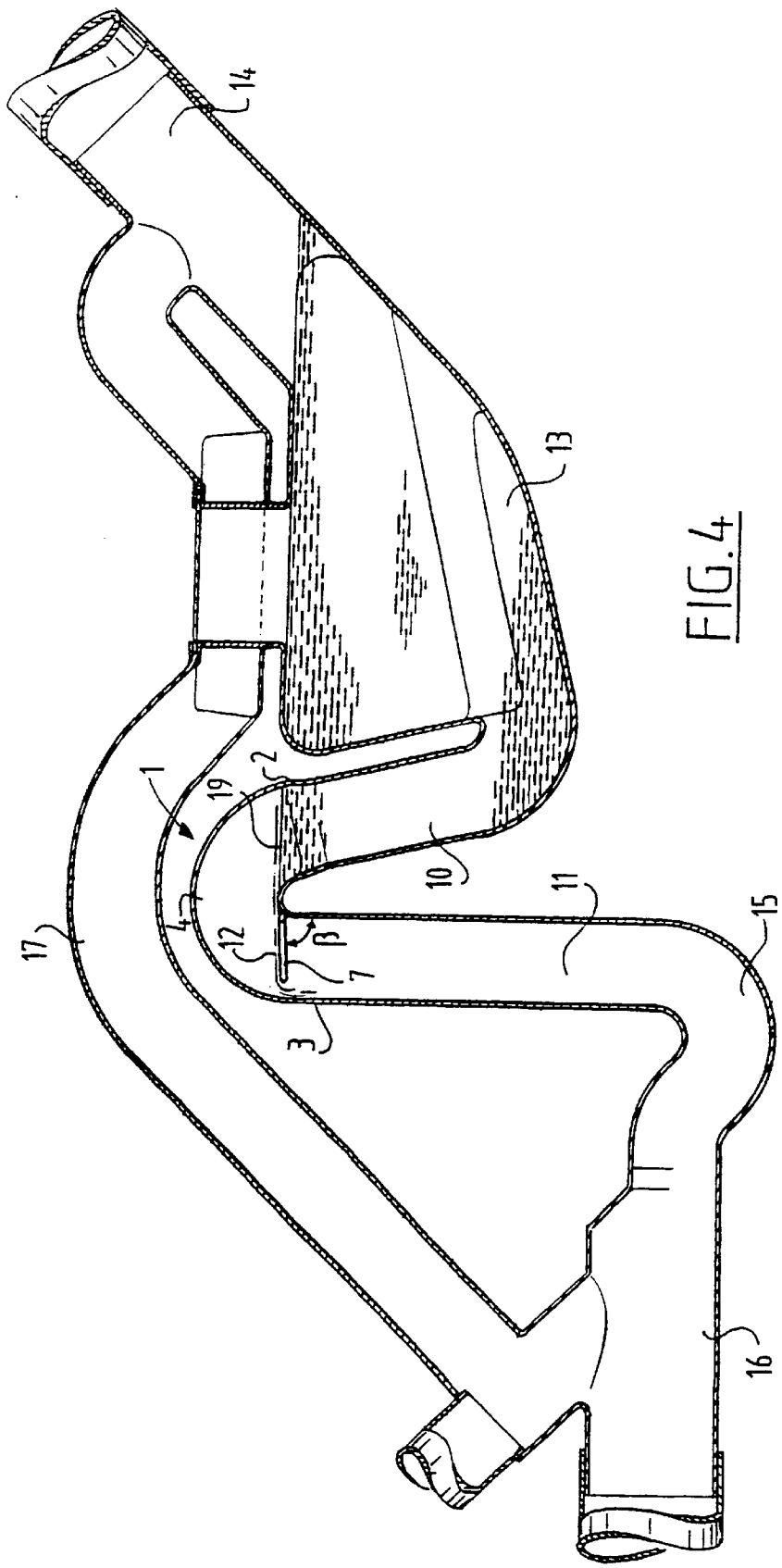
FIGS. 4 and 5 are longitudinal sections of the siphon installation of FIG. 3 in mounted situation, respectively at the beginning of siphoning action and during a siphoning action.
Figure 5:
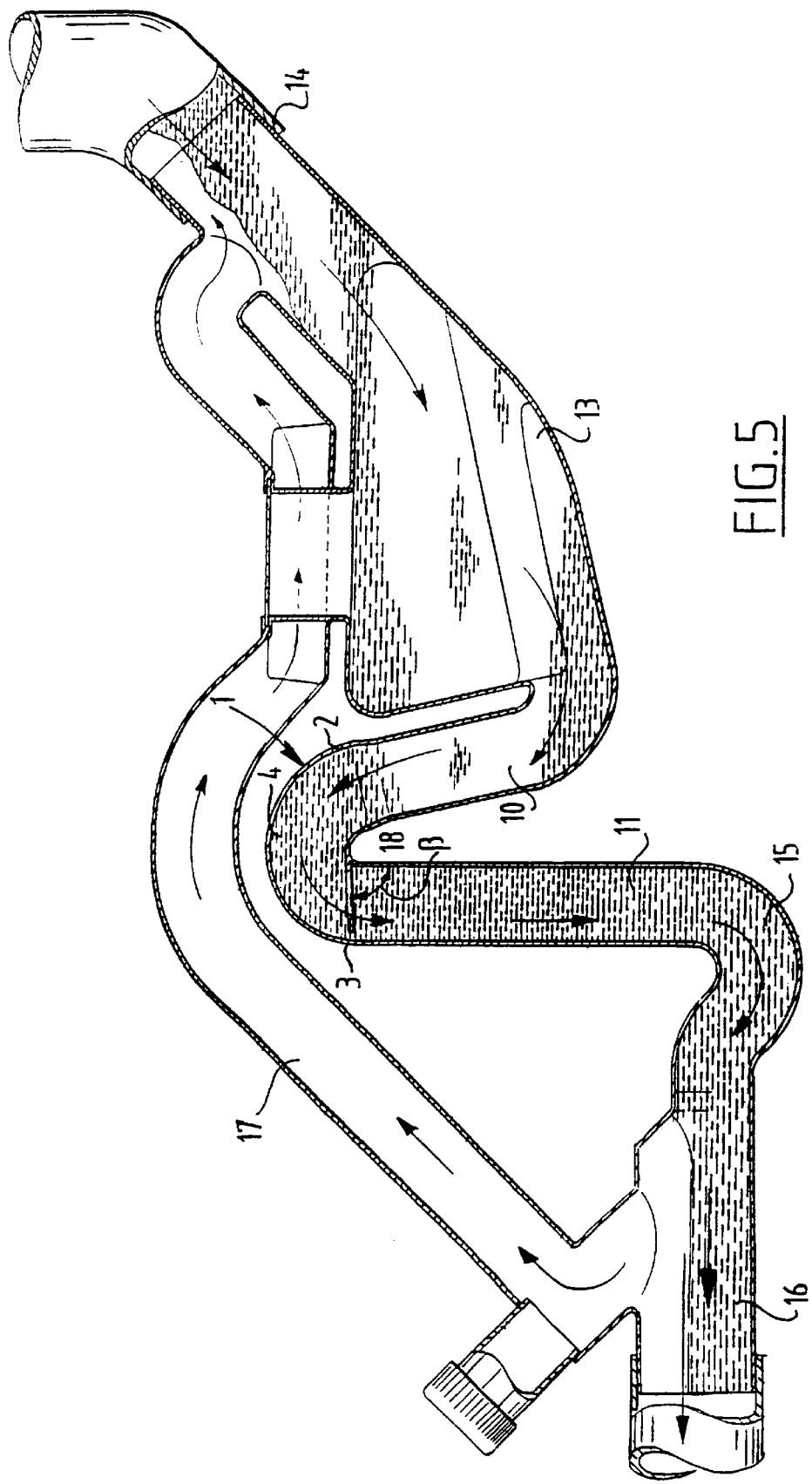

The pipe bend 1 according to the invention can advantageously be applied in a siphon installation 9 as described in applicant's above stated patent application NL 1003672. Such a siphon installation 9 consists of a collection reservoir 13 which is connected to a pipe 14 through which waste water is supplied and is connected over a riser pipe 10 and a fall pipe 11 to a discharge pipe 16 for further transporting of the waste water. Also arranged herein between fall pipe 11 and discharge pipe 16 is a U-shaped pipe part 15 which functions as liquid seal. Discharge pipe 16 and supply pipe 14 are further mutually connected by means of a vent pipe 17. Siphon installation 9 herein operates to ensure a sufficient flow speed in the discharge system even in the case of relatively small quantities of waste water such as occur when flushing for instance a modern toilet, in order to avoid as far as possible the risk of deposition and blockage. Herein, when reservoir 13 and the riser pipe 10 connected thereto are filled such that the liquid level 19 has reached the highest point of the bottom 18 of pipe bend 1 (FIG. 4), the liquid is guided by rib 7 along the wall 6 of fall pipe 11 while forming a liquid curtain 12 which closes off fall pipe 11. A siphoning action is hereby started in the above described manner which results in reservoir 13 being sucked completely empty (FIG. 5). The waste water is thus transported through the discharge system at relatively high speed, whereby the danger of deposition and blockage is greatly reduced.

What is claimed is:

1. A pipe bend, comprising:
   two cooperating pipe parts centre lines of which define a first angle; and
   a curved pipe part connecting the two pipe parts, the curved pipe part including means extending from the curved pipe part into a first of the pipe parts for guiding a liquid flow in the first pipe part,
   wherein the flow guiding means is arranged for forming, in use, a liquid curtain for starting a siphoning action.

2. The pipe bend as claimed in claim 1, wherein the flow guiding means includes at least one rib protruding from a wall of the first pipe part and forming a side wall when in use extending at a second angle to the centre line of the first pipe part.

3. The pipe bend as claimed in claim 2, wherein the rib extends substantially transversely of the centre line of the first pipe part.

4. The pipe bend as claimed in claim 2, wherein the rib defines a third angle with the centre line of the other pipe part, with the third angle larger then the first angle.

5. The pipe bend as claimed in claim 2, wherein an element disturbing the liquid flow is positioned in the curved pipe part and the rib is placed along the flow-disturbing element and connected thereto.

6. A siphon installation, comprising:
   at least one riser pipe inclining in an upward direction as viewed in a siphoning direction when in use; and
   a downward directed fall pipe connected to the at least one riser pipe, wherein the at least one riser pipe and the fall pipe are connected at respective upper ends by a pipe bend, and wherein a flow guiding means extends in a pipe part connected to the fall pipe.

7. The pipe bend as claimed in claim 3, wherein the rib defines a third angle with a centre line of the other pipe part, with the third angle larger than the first angle.

8. The pipe bend as claimed in claim 3, wherein an element disturbing the liquid flow is positioned in the curved pipe part and the rib is placed along the flow-disturbing element and connected thereto.

9. The pipe bend as claimed in claim 4, wherein the element disturbing the liquid flow is positioned in the curved pipe part and the rib is placed along the flow-disturbing element and connected thereto.

* * * * *

UNITED STATES PATENT AND TRADEMARK OFFICE
CERTIFICATE OF CORRECTION

PATENT NO : 6,161,594
DATED : December 19, 2000
INVENTOR(S) : Cornelis Wilhelmus Maria Bente Page 1 of 2

It is certified that error appears in the above-identified patent and that said Letters Patent is hereby corrected as shown below:

Title Page [75] "Cornelis" should read --Robertus Cornelis--

Column 1, Line 11 after "part." insert --(new paragraph) 2. Description of the Prior Art--.

Column 1 after Line 12 delete "2. Description of the Prior Art".

Column 1, Line 17 "wich" should read --which--.

Column 1, Line 22, "form" should read --from--.

Column 1, Line 29 "provision" should read --provisions--.

Column 2, Line 45 "drawing, in which:" should read --drawings.--

Column 2 after Line 45 insert --BRIEF DESCRIPTION OF THE DRAWINGS--.

Column 2, Line 47 "invention." should read --invention,--.

UNITED STATES PATENT AND TRADEMARK OFFICE
CERTIFICATE OF CORRECTION

PATENT NO : 6,161,594
DATED : December 19, 2000
INVENTOR(S) : Cornelis Wilhelmus Maria Bente It is certified that error appears in the above-identified patent and that said Letters Patent is hereby corrected as shown below:

Column 2 after Line 55 insert --DETAILED DESCRIPTION OF THE PREFERRED EMBODIMENTS--.

Claim 4, Line 29, Column 4 "then" should read --than--.

Signed and Sealed this

Twenty-ninth Day of May, 2001

Attest:

NICHOLAS P. GODICI

*Attesting Officer*   *Acting Director of the United States Patent and Trademark Office*